United States Patent
Allebach et al.

(10) Patent No.: US 6,829,063 B1
(45) Date of Patent: Dec. 7, 2004

(54) METHOD FOR DESIGNING SETS OF COLOR MATRICES THAT TILE TOGETHER

(75) Inventors: Jan P. Allebach, Lafayette, IN (US); Qian Lin, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

(21) Appl. No.: 09/594,235

(22) Filed: Jun. 14, 2000

(51) Int. Cl.$^7$ .......................... G06K 15/00; H04N 1/405
(52) U.S. Cl. ...................... 358/3.13; 358/3.16; 358/534; 358/535
(58) Field of Search ................................ 358/534, 535, 358/536, 3.13, 3.14, 3.15, 3.16, 3.17, 3.18, 3.19, 3.07, 3.08; 382/232, 237

(56) References Cited

U.S. PATENT DOCUMENTS

| | | | |
|---|---|---|---|
| 5,150,428 A | * 9/1992 | Leone et al. | 382/270 |
| 5,701,366 A | * 12/1997 | Ostromoukhov et al. | 382/237 |
| 5,745,660 A | 4/1998 | Kolpatzik et al. | 395/108 |
| 5,812,744 A | 9/1998 | Allebach et al. | 395/109 |
| 5,946,452 A | * 8/1999 | Spaulding et al. | 358/1.9 |
| 6,081,349 A | * 6/2000 | Ebitani et al. | 358/3.19 |
| 6,204,934 B1 | * 3/2001 | Minamino | 358/1.9 |

OTHER PUBLICATIONS

Dhiraj Kacker and Jan P. Allebach, "Aperiodic Micro Screen Design using DBS and Training," SPIE—The International Society for Optical Engineering, vol. 3300, pp. 386–397, Jan. 1998.

Z. Baharav and D. Shaked, "Watermarking of Dither Half-toned Images," SPIE—The International Society for Optical Engineering, vol. 3657, pp. 307–316, Jan. 1999.

* cited by examiner

Primary Examiner—Thomas D. Lee (57) ABSTRACT

A method and system for jointly designing at least two sets of dither matrices. First, a mosaic color tile is generated for a first concentration level according to a design tile map. The mosaic color tile includes at least a first color tile and a second color tile where each color tile has a color tile concentration level (CTCL) and a color tile number (CTN). Second, a color fluctuation metric is performed on the mosaic color tile. Next, the pixels in the first color tile are modified by an operation (e.g., a swap operation) while maintaining the first concentration level. Then, a color fluctuation metric is re-calculated on the mosaic color tile with all first color tiles being replaced with the modified first color tile (i.e., everywhere the first color tile appears in the mosaic color tile as specified by the design tile map). Performing the step of modifying the color tiles and re-calculating the color fluctuation metric for the modified mosaic tile until the metric is below a predetermined metric level.

20 Claims, 8 Drawing Sheets

METHOD FOR DESIGNING SETS OF COLOR MATRICES THAT TILE TOGETHER

BACKGROUND OF THE INVENTION

1. Field of the Invention

The present invention relates generally to systems and methods for generating halftone images, and more particularly, to a method of designing sets of color matrices that tile together for use in creating color halftone images.

2. Description of the Prior Art

Digital halftoning refers to any process that creates the illusion of continuous-tone images by judicious arrangement of the binary picture elements, such as ink drops in the case of inkjet printers. Thus, halftoning is printing the simulation of a continuous-tone image, such as a shaded drawing or photograph with groups or cells of color or black dots. The dots are placed in such a way that they appear to the human eye to be a single color.

Figure 1:
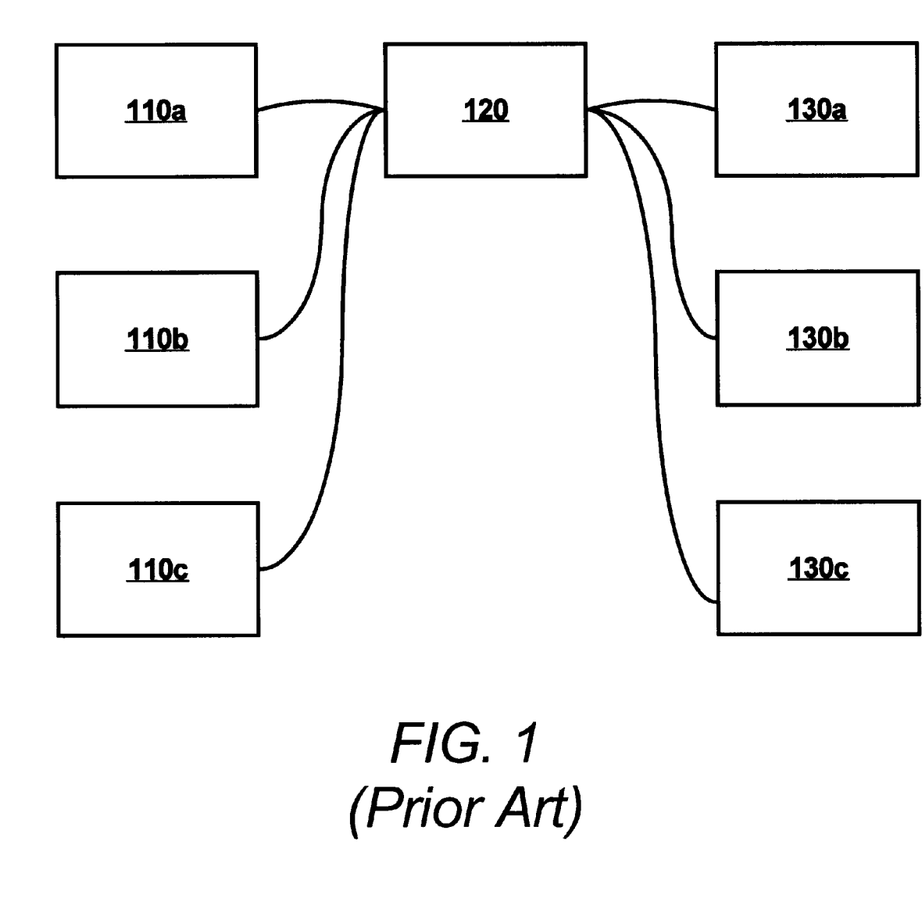
FIGS. 1 and 2 show representations of conventional printing systems used for generating a color print image.

There are many halftoning techniques, each with its own method for laying down dots. Suppose a source color image is represented by the red, green and blue components. The simplest way of halftoning a color image using a dither matrix is to halftone each color plane independently using the same dither matrix. Each color defines a color concentration level. The term "color concentration level" for a color image is analogous to the term "gray level" for a black and white image. FIG. 1 shows a representation of a printing system for generating a color print image. The image planes 110a, 110b, 110c are representative of the red, green and blue color components of an image. A single dither matrix 120 is used to halftone each image independently to create halftone images 130a, 130b, 130c. To create the halftone images 130a, 130b, 130c, pixel values in the image planes 110a, 110b, 110c are compared to the corresponding entries in the dither matrix 120 to determine which of the pixel values should be turned on or off. Halftoning is accomplished by a simple pointwise comparison of the source image 110 against a predetermined threshold array or mask. For every point or pixel in the source image, depending on which point value is larger (i.e., the image or the mask), either a 1 or 0, respectively, is placed at the corresponding location in the binary output image.

Let the red, green and blue components of the source image 110 at pixel (m,n) be r(m,n), g(m,n) and b(m,n), respectively. If the dither matrix threshold value at the same position is t(m,n), then one of the most commonly used halftone rules is:

if r(m,n)<t(m,n), print a cyan dot at (m,n);

if g(m,n)<t(m,n), print a magenta dot at (m,n);

if b(m,n)<t(m,n), print a yellow dot at (m,n).

Figure 2:
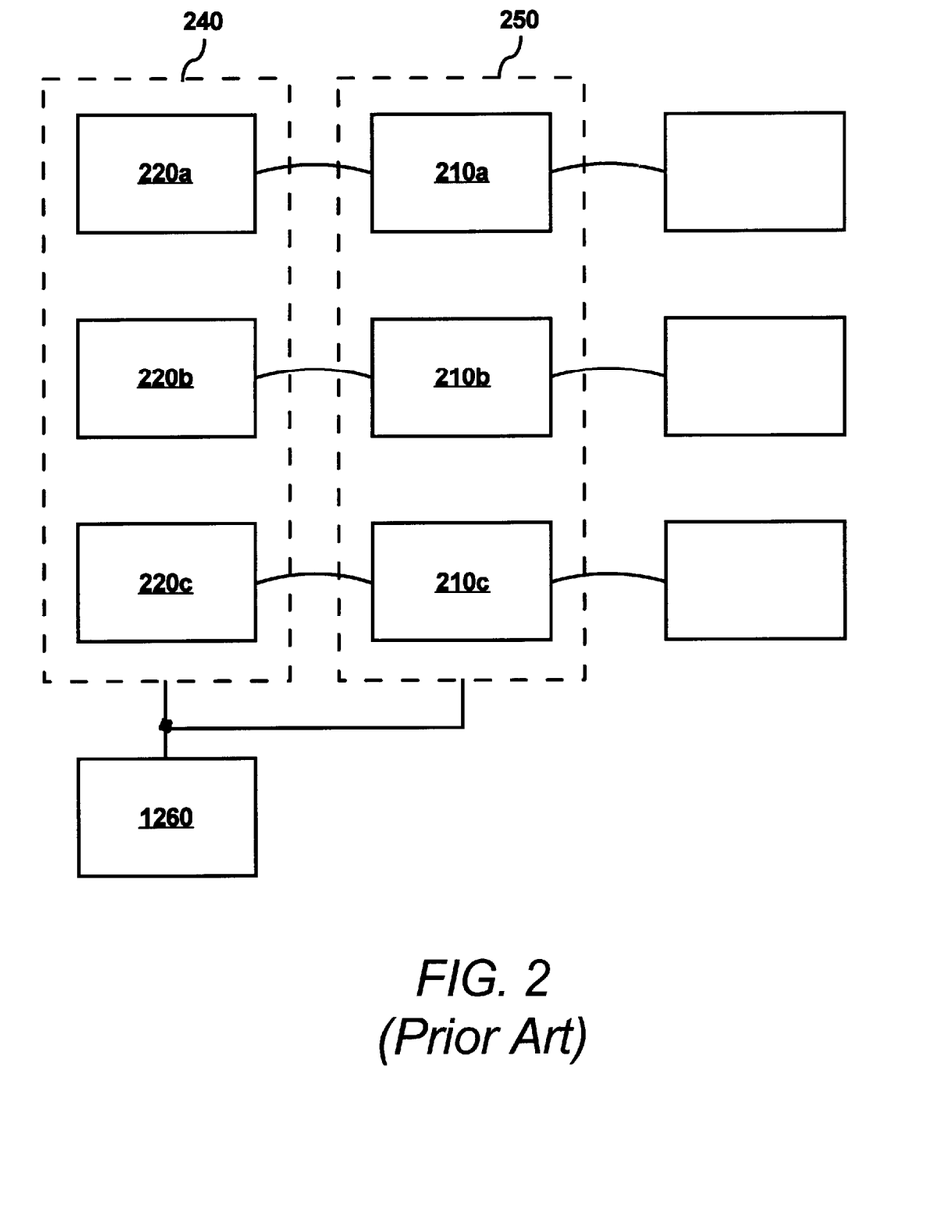

Unfortunately, the basic halftoning technique described above creates an unacceptable level of artifacts in the resulting halftone image, leading to poor image quality. In response to this problem, U.S. Pat. No. 5,812,744 to Allebach et al. (hereinafter referred to as "the '744 patent") describes a method of jointly designing a single set of color dither matrices. Referring to FIG. 2, which is taken from the '744 patent, the method described in the '744 patent generates a separate dither matrix 210a, 210b, 210c for each separate color image plane 220a, 220b, 220c, respectively. According to the '744 patent, using a set of dither matrices (i.e., a separate dither matrix for each color plane) reduces the halftone texture and increases the sharpness of the halftone image without increasing the complexity of the computations required.

While the methods described in the '744 patent clearly provided improvements to the existing technology, the set of dither matrices needed for the '744 scheme consumes more memory than a single dither matrix for all color planes as utilized by the prior art. Accordingly, it is desirable to develop a mechanism that reduces the memory requirements while maintaining or improving the print quality provided by the dither matrices provided by the '744 patent.

Moreover, halftoning in accordance with teachings of the '744 patent occasionally introduces undesirable periodic artifacts that stem from having a single set of dither matrices for use in the halftoning process. As the desktop printers increase in resolution (e.g. with 120+dpi), the conventional 128×128 screens can produce a distinctive periodicity in the printed images.

In addition, it would be desirable to be able to encode information into a halftone image to determine the source of the print. As can be appreciated, the ability to identify the source of any print would have useful application in authentication and fraud detection (e.g., counterfeit detection). Unfortunately, when there is a single set of dither matrices, as is provided by the '744, it is not possible to encode information into the resulting halftone image. Instead, multiple sets of dither matrices that can be utilized to halftone an image are required in order to encode information into the halftone image.

An example of using two sets of dither matrices (instead of one) to encode watermark information into dither hafltone images is described in "Watermarking of Dither Halftoned Images," written by Z. Baharav and D. Shaked, and published in the Proceedings of SPIE, Vol. 3657 as part of the IS&T/SPIE Conference on Security and Watermarking of Multimedia Contents, San Jose, Calif., January 1999. However, this example is limited to black and white images.

As can be appreciated, such a security system is dependent on a mechanism to design or generate multiple sets of dither matrices that can be utilized to encode information and yet at the same time tile together seamlessly for good print quality. One approach to designing multiple sets of dither matrices that can tile together seamlessly is described in "Aperiodic Micro Screen Design using DBS and Training," written by D. Kacker and J. Allebach, and published in the Proceedings of SPIE, Vol. 3300 as part of the IS&T/SPIE Conference on Color Imaging: Device-Independent Color, Color Hardcopy, and Graphic Arts III, San Jose, Calif., January 1998. Unfortunately, this screen design method is only applicable to monochrome images. Accordingly, it is desirable for there to be a mechanism for designing color dither matrices that tile together seamlessly so that a watermark system, as described above, can be implemented for color images.

Unfortunately, there is no current approach to design multiple sets of color dither matrices. Furthermore, as noted previously, any approach must consider the memory requirements of these multiple sets of dither matrices. It is preferable that the storage requirements of these sets of dither matrices be the same or less than the storage needed by the single set of dither matrices.

Accordingly, there remains a need for a method of generating multiple sets of color dither matrices that occupy less storage space, increases halftone image quality, and that enable the encoding of information in the halftone image.

SUMMARY OF THE DISCLOSURE

A method for jointly designing at least two sets of dither matrices is described. First, a mosaic color tile is generated for a first concentration level according to a design tile map. The mosaic color tile includes at least a first color tile and a second color tile where each color tile has a color tile concentration level (CTCL) and a color tile number (CTN). Second, a color fluctuation metric is computed for the mosaic color tile. Next, the pixels in the first color tile are modified by an operation (e.g., a swap operation) while maintaining the first concentration level. Then, a color fluctuation metric is re-calculated on the mosaic color tile with all first color tiles being replaced with the modified first color tile (i.e., everywhere the first color tile appears in the mosaic color tile as specified by the design tile map). The steps of modifying the color tiles and re-calculating the color fluctuation metric for the modified mosaic tile is performed until the metric is below a predetermined metric level or until further changes yield only a small decrease in the metric (i.e., the decrease in the metric is less than a predetermined decrease). The other concentration levels are processed in like manner. When all concentration levels have been processed, color dither matrices are generated.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known circuits and components are omitted so as not to obscure the description of the present invention with unnecessary detail.

A few definitions will be provided to facilitate a better understanding of the principles of the present invention. A "tile" is a halftone pattern of ones and zeros for a particular concentration level. For a black and white image, the tile is a halftone pattern of ones and zeros for a particular gray-level.

A "dither matrix" is a matrix having a pattern with values from 0 to 255 that is the sum of the tiles at all concentration levels.

A "color tile" is related to color images and is a halftone pattern of ones and zeros for a particular color concentration level. Each color of a color space is typically represented by 256 color concentration levels (e.g., levels 0 to 255). A color tile has associated with it a particular concentration level and a particular color tile number, which is defined below. Each color tile can be a matrix having a size of L X L, with each matrix element (also referred to herein as pixel element) containing a value that represents values for each color plane at a particular concentration level.

A "color dither matrix" is a matrix having a pattern with values from 0 to 255 that is the sum of the color tiles at all concentration levels for a every color.

"Color Tile Number" (CTN) identifies a specific tile, and if there are a total of N tiles, then the tile number can range from 0 to N−1.

A "design tile map" (DTM) is a two-dimensional array whose elements are color tile numbers ranging from 0 to N−1. The design tile map specifies the placement of the different sets of color tiles in a mosaic color tile, which is defined below, and is utilized by the present invention in designing the multiple sets of color tiles.

A "mosaic color tile" (MCT) is a two-dimensional array whose contents are color tiles whose location is identified by the design tile map for a given concentration level.

A "run-time tile map" (RTM) is a two-dimensional array whose elements are color tile numbers ranging from 0 to N−1. The run-time tile map specifies a particular set of color dither matrices to use in halftoning a particular location in the continuous image.

The present invention generates multiple sets of color dither matrices that can be tiled together seamlessly. In other words, halftone images generated by these color dither matrices do not exhibit visible boundary effects in areas between color matrices selected from different sets.

Use of the Sets of Color Dither Matrices

Once the multiple sets of color matrices have been designed by the technique of the present invention, these multiple sets of color matrices are then available for use in generating halftone images from continuous tone images. During the halftone process, a run-time tile map can be generated that can be the same or different from the tile map referred to above that is utilized to design the sets of color matrices. This run-time tile map specifies a particular set of color dither matrices to be used to halftone a particular location or region in the image. Specifically, the run-time tile map determines the particular set of color dither matrices to be used to generate the resulting halftone image. At each block of pixels (e.g., a block of 64×64 pixels) in the continuous-tone image, the run-time tile map is utilized to select the particular set of color matrices to compare with the colorant values in the continuous-tone image.

As will be explained hereinafter, the run-time tile map can be used for encoding information into the halftone image rendered in accordance therewith.

For example, the sequence of designation identifier for the particular set of color matrices can be stored as a string of information bits (e.g., ones and zeros) when there are two sets of color matrices and utilized at a later time for decoding the information from the halftone image. Many applications, such as fraud detection, require the use of multiple sets of color matrices. Unfortunately, the prior art techniques of designing dither matrices are unable to generate sets of color matrices that can be tiled together seamlessly (i.e., without visible artifacts at the boundaries of color matrices from different sets of color matrices).

Color Dither Matrix Design System 340

Figure 3:
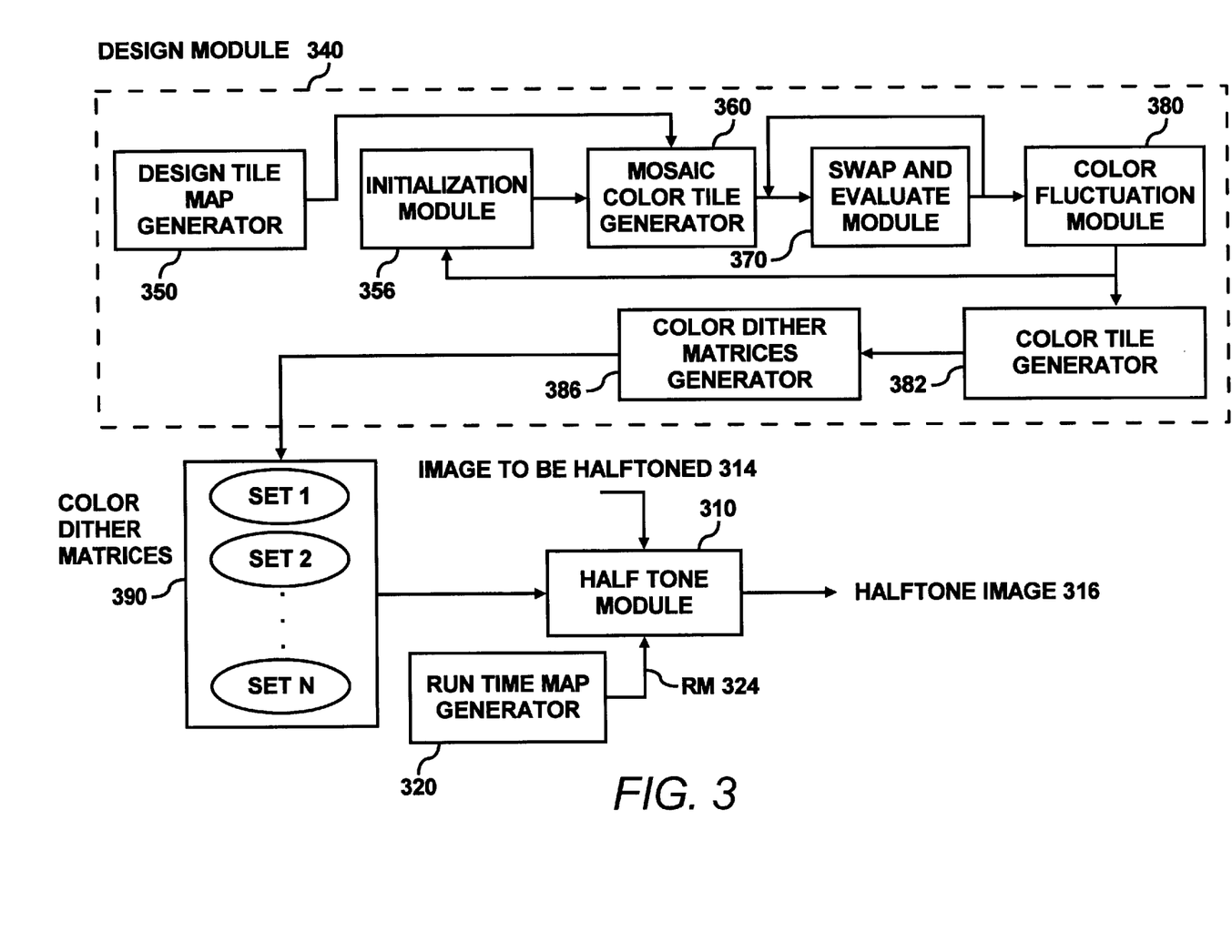
FIG. 3 shows a representation of a printing system used for generating a color print image according to one embodiment of the present invention.
Figure 4:
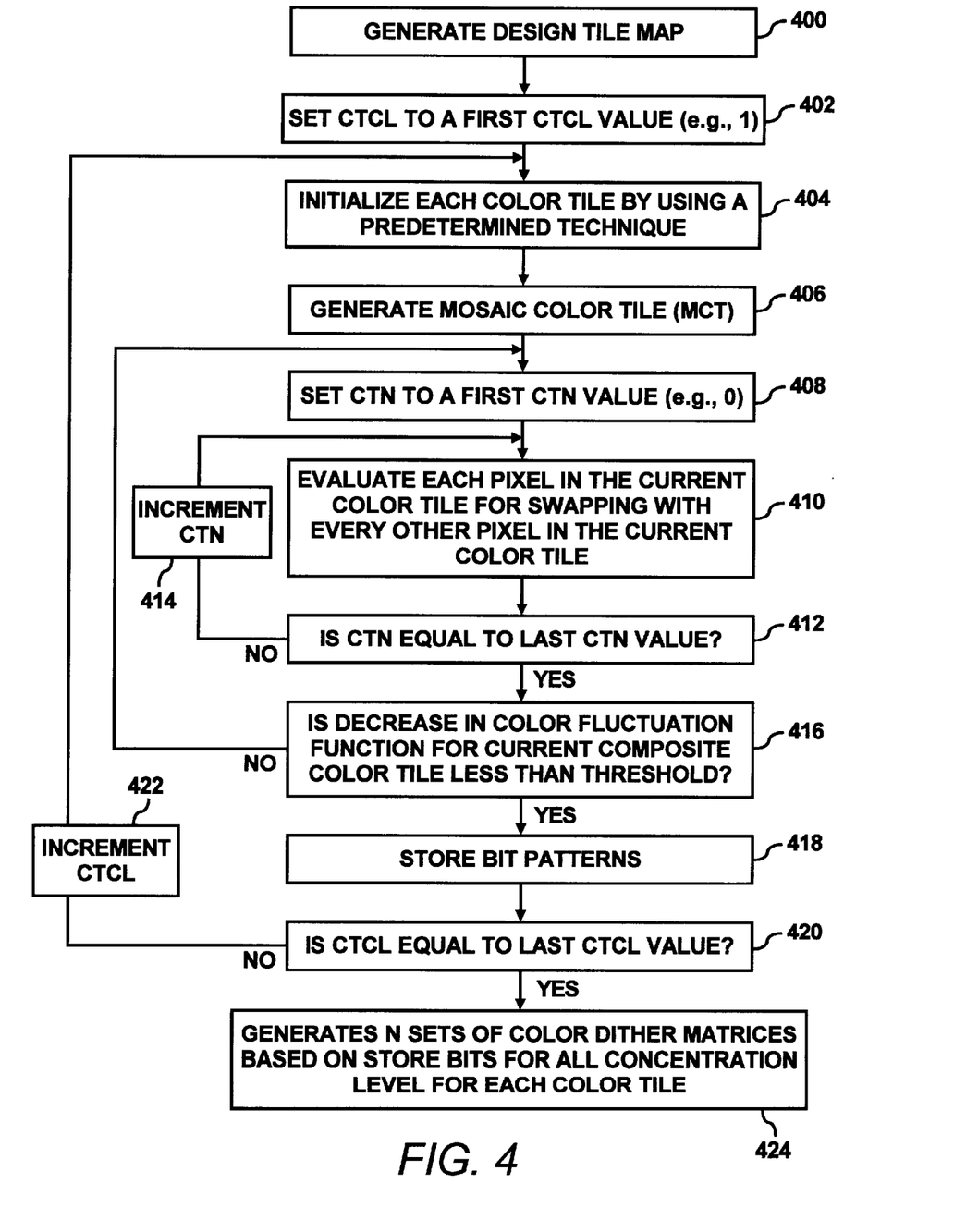
FIG. 4 is a flowchart showing the steps of generating multiple sets of dither matrices according to one embodiment of the present invention.

One embodiment of the color dither matrix design system and method of the present invention is described now with reference to FIGS. 3 and 4. FIG. 3 is a block diagram that illustrates a color dither matrix design system 340 (hereinafter referred to as "design module 340") configured in accordance with one embodiment of the present invention and a half-tone module 310 that can use the color dither matrices designed by the present invention to generate half-tone images 316.

The design module 340 designs sets 390 of color dither matrices that may be used by the halftone module 310 or by other rendering processes. The halftone module 310 includes a first input for receiving an image 314 to be half-toned, a second input for receiving a run-time map (RM) 324 that is generated by a run-time map generator 320, a third input for receiving the set 390 of color dither matrices designed by the design module 340, and generates a halftone image 316 of the input image 314 based on these inputs. This input image 314 can, for example, be a continuous tone image.

In conventional halftone processing, a single set of color dither matrices is provided to the half-tone module. Accordingly, the half-toned image could only be generated using this single set of color dither matrices. In fact, jointly designing a single set of color dither matrices that can be used to halftone an image with good visual quality is in itself a significant challenge and the subject of the '744 patent that was described previously. In contrast, the present design module 300 generates multiple sets 390 of color dither matrices that can tile together seamlessly. Accordingly, the halftone image 316 can be rendered in different ways since multiple sets of color matrices are available. Specifically, a first portion of the input image 314 can be halftoned by using a first set of color dither matrices (e.g., SET1) and a second portion of the input image 314 can be half-toned by using a second set of color dither matrices (e.g., SET2). As described in greater detail hereinafter, generating a halftone image 316 with multiple sets of color matrices improves the image quality, provides space savings, and enables the encoding of information into the halftone image 316.

The design module 300 includes a design tile map generator 350 for generating a design tile map (FIG. 4, step 400). An initialization module 356 is provided to initialize the color tiles for a current color tile level (CTL) (FIG. 4, step 404). A mosaic color tile (MCT) generator 360 is coupled to the design tile map generator 350 for receiving the design tile map and is coupled the initialization module 356 for receiving the initialized color tiles at the current level. Based on these inputs, the MCT generator 360 generates a mosaic color tile for the current level (FIG. 4, step 406). An example of a mosaic color tile is provided and described hereinafter.

A swap and evaluate module 370 is coupled to the MCT generator 360 for receiving the mosaic color tile for the current level and for performing swap operations and evaluate operations on every pixel in the current color tile (FIG. 4, step 410). The swap operations and evaluate operations are described in greater detail hereinafter. The swap and evaluate operations are performed on the color tiles for all the color tile numbers one level at a time (e.g., one color tile concentration level at a time).

A color fluctuation module 380 is coupled to the swap and evaluate module 370 for receiving a color fluctuation function, and based thereon, determines if the decrease in the color fluctuation function is less than a predetermined threshold (FIG. 4, step 416). If so, the bit patterns of the color tiles for all color tile numbers for the current level are stored (FIG. 4, step 418), and processing proceeds to the next color level unless all color tile levels have been processed (FIG. 4, the loop that includes steps 420, 422, and 404–420). Otherwise, the swap and evaluate module 370 repeats the swap and evaluate operations for each color tile number (FIG. 4, the loop that includes steps 414, 410, and 412).

A color tile generator 382 is coupled to the color fluctuation module 380 to receive the stored bit patterns. When all the color tile levels are processed, the color tile generator 382 uses the stored bit patterns for each of the color tile levels and generates multiple sets of color tiles. A color dither matrices generator 386 is coupled to the color tile generator 382 for receiving the multiple sets of color tiles, and based thereon, generates multiple sets 390 of color dither matrices (FIG. 4, step 424).

Design Process

FIG. 4 is a flowchart showing the steps of designing multiple sets of color dither matrices according to one embodiment of the present invention. The steps in the flowchart of FIG. 4 are further illustrated in connection with the examples set forth in FIGS. 5 and 6.

Figure 5:
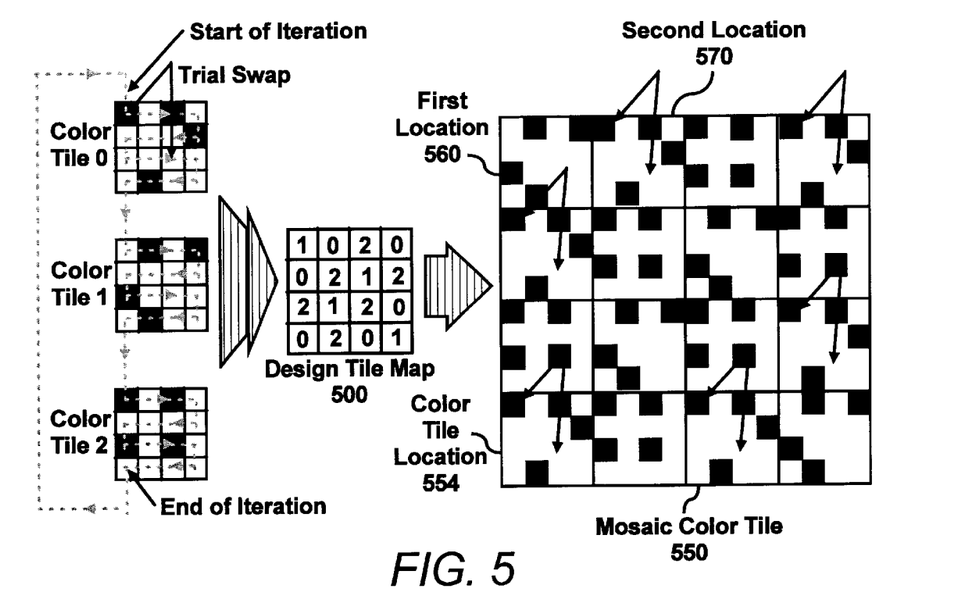
FIG. 5 is a schematic diagram illustrating the initialization of color tiles and the formation of a mosaic color tile.

In step 400, a design tile map 500, is generated. FIG. 5 illustrates an exemplary tile map 500. The tile map 500 includes a plurality of elements that are arranged in rows and columns. Each element specifies a particular color tile number (CTN). In this example, there are three possible color tile numbers (CTNs) that are denoted by the numbers 0, 1 and 2. It is noted that the possible color tile numbers is not limited to three and can be more or less than three. In this regard, the actual number of possible CTNs can be selected to suit a particular application.

Each color tile includes a plurality of pixel value elements (herein referred to as "pixels") for each color tile concentration level (CTCL). These pixels can be also be arranged in rows and columns. The pixels for all color tile concentration levels (CTCL) of a particular color tile number are utilized to generate a set of dither matrices that correspond to that particular color tile number. However, as described in greater detail hereinafter, the design process processes the color tiles one concentration level at a time. Once all the concentration levels of all the color tile numbers have been processed, the multiple sets of color dither matrices can be generated.

Figure 6:
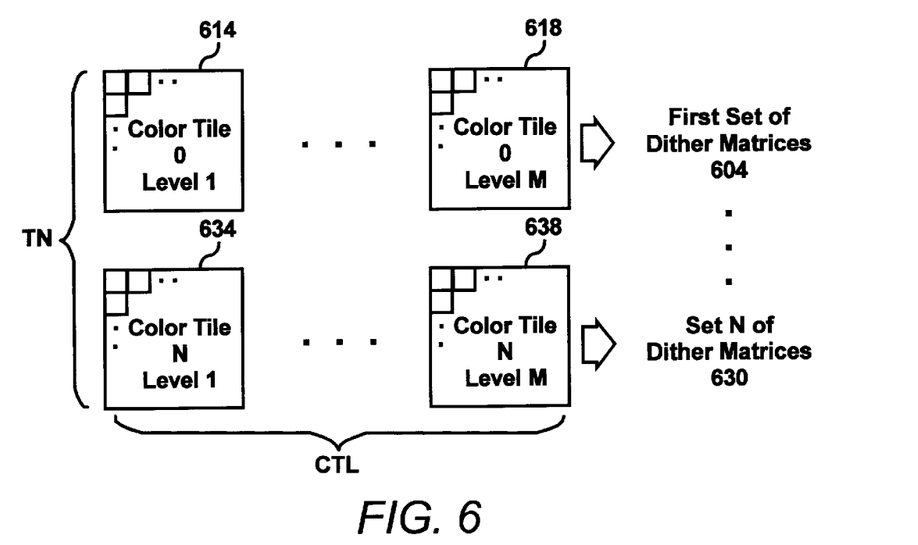
FIG. 6 illustrates how multiple sets of color dither matrices are generated from a set of color tiles at different concentration levels.

FIG. 6 illustrates how multiple sets of color dither matrices are generated from a set of color tiles at different concentration levels. A first set 604 of color dither matrices is generated based on a plurality of color tiles (e.g., color tile 614 and color tile 618) at all concentration levels (e.g., levels 1 to M) that have a common CTN (e.g., CTN=0). The Nth set of color dither matrices 630 is generated based on the color tiles (e.g., color tile 634 and color tile 638) at all concentration levels (e.g., levels 1 to M) having a CTN of N. Preferably, the resulting dither matrices have the same number of pixel elements as the color tiles. In one embodiment, the color tiles and the dither matrices include a block of 64×64 pixel values.

Although the design tile map 500 is illustrated as being a 4×4 matrix, it can be of any size P×P. However, for ease of implementation, it is preferable that LP×LP is a power of 2.

The design tile map 500 can be generated using a random number generator. The adjacency of the elements in the design tile map 500 is preferably constrained so as to minimize undesirable artifacts in the halftone image. In one embodiment, the adjacency of the elements in the design tile map 500 is constrained such that the maximum run length of the same element in both the vertical directions (i.e., 90 degrees and 270 from the horizontal) and horizontal directions (i.e., zero and 180 degrees from the horizontal) is one, and the maximum run length of the same element in the diagonal directions (i.e., 45, 135, 225, and 315 degrees from the horizontal) is two. In the present invention, "maximum run length" refers the length of a successive sequence or string of elements. When the total number of color tiles is less than five, the adjacency constraints may need to be relaxed.

In step 402, the color tile concentration level (CTCL) is set to a first CTCL value (e.g., setting the current CTCL to 1). As described hereinafter with reference to processing step 422, the CTCL is incremented to process all concentration levels. As illustrated in FIG. 6, there can be M concentration levels.

In step 404, the color tiles for all CTNs at a current CTCL (e.g., CTCL=1) are initialized by using a predetermined initialization technique. For example, the initialization may be accomplished by randomly adding dots (i.e., ones) to the color tile at selected locations according to a predetermined histogram. The histogram specifies the number of dots to add at each concentration level (e.g., level 1 to level 255). An example of such an initialization process that uses a histogram is illustrated in U.S. Pat. No. 5,760,920, entitled "System and Method for Generating Calibrated Dither Matrices," Qian Lin and Brian Hoffmann, whose disclosure is incorporated herein by this reference as though fully set forth herein. It is noted that the design process can start at level 1 and proceed to level 255 by selectively adding dots for levels 2 to 255, or the design process can start at an intermediate level (e.g., 20) and selectively remove dots to design the levels below 20 (i.e., levels 19 to 0) and selectively add dots to design levels 21 to 255.

After step 404 has been completed, color tiles for all CTNs at the first level (e.g., color tile0, color tile1, and color tile2) have been assigned initial values.

In step 406, a mosaic color tile is generated. Referring to FIG. 5, a mosaic color tile 550 includes a plurality of color tile locations 554. The design tile map 500, generated in step 400, specifies a particular color tile by CTN, for example, for each color tile location. For example, a first location 560 in the mosaic color tile 550 contains the color tile for the first concentration level selected from the Color Tile 1 color matrices (i.e., CTN=1). Similarly, a second location 570 contains the color tile for the first concentration level selected from the Color Tile 0 color matrices (i.e., CTN=0).

In step 408, the CTN is set to a first CTN value (e.g., CTN=0). the current CTCL is the last CTCL level (e.g., CTCL=255). If the current CTCL is not the last CTCL value, then the CTCL is incremented in step 422, and processing returns to step 404 to generate a next CTCL of all the color tiles according to steps 404–418. Steps 404–418 are repeated for each subsequent level until all CTCL of all sets of color tiles (i.e., all CTNs) have been generated.

In step 424, N sets of color dither matrices are generated based on the N color tiles at each level. For example, for a particular CTN between 0 and (N−1), each element in a color dither matrix has a value that is computed by accumulating the values at the location of that element for all the color tiles with that CTN vsalue at all concentration levels.

Step 410

Figure 7:
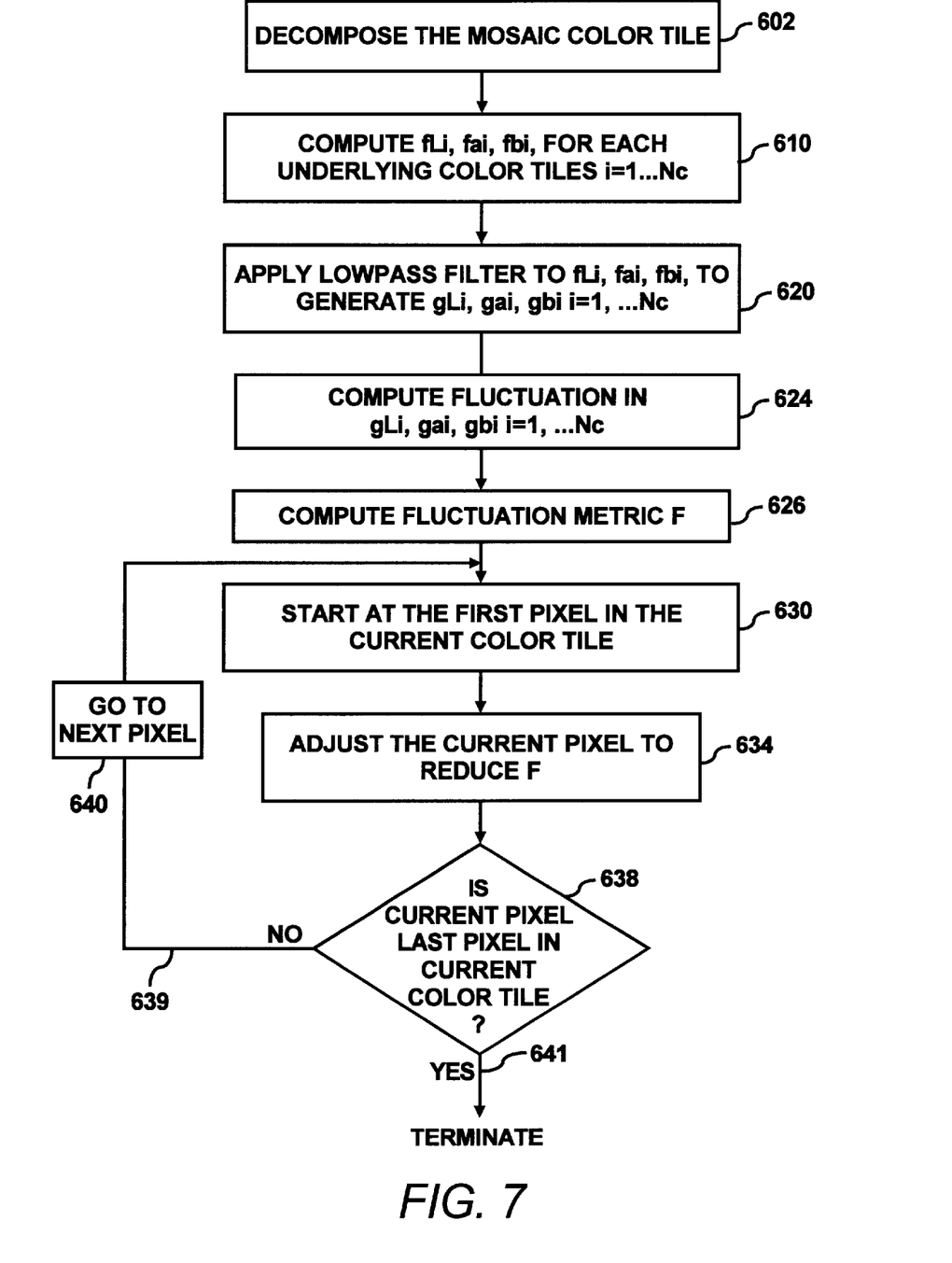
FIG. 7 is a flowchart illustrating the steps for refining each color tile according to one embodiment of the present invention.
Figure 8:
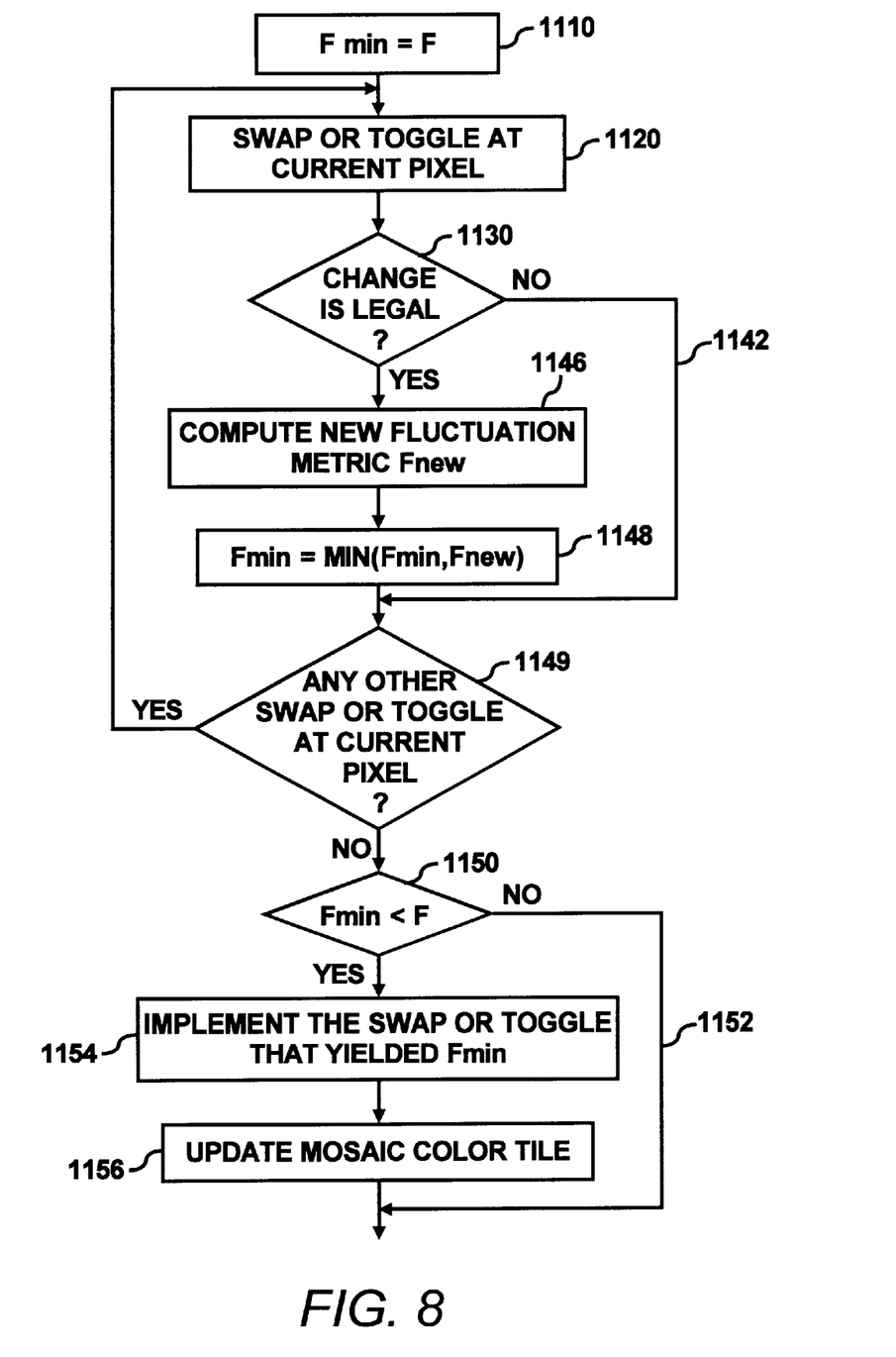
FIG. 8 is a flowchart showing how a current pixel is adjusted to minimize the fluctuation metric according to one embodiment of the present invention.

As explained above, processing step 410 can be performed by using the steps illustrated in FIGS. 7 and 8. FIGS. 7 and 8 are actually based on FIGS. 6 and 11, respectively, from the '744 patent, whose disclosure is incorporated by this reference as though fully set forth herein. In fact, the numeral designations from FIGS. 6 and 11 of the '744 patent have been retained in FIGS. 7 and 8, respectively, herein.

Referring to FIG. 7, the sequential adjustment of each pixel in step 410 of FIG. 4 is actually performed by steps 630–644. However, before the adjustments can be made, it is necessary to first compute a color fluctuation metric for the mosaic color tile corresponding to a current concentration level, which is accomplished in steps 602–626.

In step 602, the present invention decomposes the mosaic color tile into primary, secondary, and tertiary colors (see FIG. 7 of the '744 patent and associated description). Even though the '744 patent describes the decomposition of a halftone pattern, the decomposition of the mosaic color tile is performed using the same techniques described in the '744 patent. In step 610, the decomposed color components are converted into a uniform color space representation fLi, fai, fbi.

In step 620, lowpass filters are applied to the fLi, fai, fbi pixel maps to generate gLi, gai, gbi. In step 624, the fluctuation in gLi, gai, gbi is computed, and in step 626, the fluctuation metric F is computed using, for example, the weighted sum of the variances of the fLi, fai, fbi pixel maps. Additional details and examples for steps 602–626 in FIG. 7 are set forth in greater detail in the '744 patent and, for the sake of brevity, shall not be repeated herein.

Turning now to the sequential adjustment of each pixel in steps 630–644, the method starts at the first pixel of the current color tile (step 630), and adjusts the current pixel (step 634), and repeats the adjustment for all pixels in the current color tile (steps 638, 639, 640). The adjustment in step 634 can be performed by either swapping or toggling to reduce the fluctuation metric F, and is illustrated in greater detail in FIG. 8. After all the pixels in the current color tile have been adjusted (see branch 641), then processing proceeds to step 412 in FIG. 4.

In summary, the '744 approach iterates as long as there is some decrease in the fluctuation metric F. Alternatively, a decrease in the fluctuation metric F can be computed, and a determination can be made whether this decrease is less than a predetermined threshold. This approach reduces the design time without visible degradation in the quality of images halftoned with dither matrices so designed.

FIG. 8 illustrates in greater detail how the adjustment in step 634 can be performed. The technique illustrated in FIG. 8 adjusts the current pixel to reduce the fluctuation metric and computes a new fluctuation metric for the current color tile. In step 1110, the minimum fluctuation metric $F_{min}$ is set equal to F, which is the current fluctuation metric.

Next, in step 1120 a swap operation or a toggle operation is performed on the current pixel. The toggle operation at a pixel refers to switching from the existing color at that pixel to any valid color. The swap operation refers to exchanging one primary color or white at the current pixel with another primary color or white at another pixel which is within a pre-specified neighborhood of the current pixel.

Whether swapping can be done depends on three conditions: (1) a valid color should be obtained after swapping, (2) the stacking property of the dither matrix is not violated, and (3) the resulting color must be on the permissible color list. The colors at both pixels after swapping must still be one of the valid colors. In other words, the swap cannot result in two dots of the same primary color (cyan, magenta, yellow or black) being placed in the same pixel location. In addition, it must be a permissible color at the color concentration level. The permissible color list is in turn dependent on the color concentration.

We select the operation (either swapping or toggling) that results in the largest reduction in the fluctuation metric F, and keep the new pattern generated by this operation. If both the swap and toggle operations result in an increase in the fluctuation metric F, then the previous pattern is restored. According to the embodiment illustrated in FIGS. 7 and 8, the current pixel is adjusted by swapping.

After the current pixel has been swapped (step 1120), step 1130 checks the current pixel to see if the change (e.g., swap) is legal according to the technique disclosed in the '744 patent. If the change is not legal, then processing proceeds along branch 1142 to step 1149 to check if there are any other possible swaps or toggles at the current pixel of the color tile.

If the change is legal, then in step 1146, a new fluctuation metric $F_{new}$ is computed. In step 1148, the current minimum fluctuation metric $F_{min}$ is set equal to the minimum of the previous $F_{min}$ and the new $F_{new}$. Processing then proceeds to step 1149 to check if there are any other swaps or toggles at the current pixel of the dither matrix 310. If there is any other swap or toggle at the current pixel of the dither matrix 310, then processing returns to step 1120. However, if there is no other swap or toggle at the current pixel of the dither matrix 310, then the fluctuation metric F is checked in step 1150 to see if it is less than the minimum fluctuation metric $F_{min}$ computed at step 1148. If the fluctuation metric is not less than $F_{min}$, then processing proceeds to step 638 of FIG. 7. If the fluctuation metric is less than $F_{min}$, then in step 1154, the swap or toggle that yielded the $F_{min}$ is implemented. The processing then proceeds to step 1156, where the mosaic color tile is updated.

Thus, from the designed sets of color matrices, one can halftone a continuous image by randomly selecting one color matrix from the set of color matrices, subject to the adjacency rule. There are several advantages of using multiple color tiles instead of a single set of dither matrices (i.e., a single tile). First, the random selection of a color tile means that the same pattern will not be repeated, thereby eliminating periodic artifacts that are occasionally visible from print samples. Second, the size of the tile can usually be made much smaller than the size of a single set of dither matrices. For example, three color tiles each having a size of 32×32 can substitute a single set of dither matrices of size 128×128. Thus, the storage requirement is 3×4×32×32 (or 12.288 k bytes) for multiple color tiles, rather than 4×128×128 bytes (or 65.536k bytes) for a single set of dither matrices. This is achieved with minimal increase in computation. Alternatively, one can pre-compute the tile map 300 and store it with little memory. For example, a 16×16 tile map having a maximum of three tiles only requires 0.25×16×16 bytes (or 0.064 k bytes) of storage, while the effective period will be 512×512. For a 600 dpi (dots per inch) printer, this periodicity is not likely to be visible.

Information Encoding and Recovery System 900.

The multiple sets of color matrices of the present invention can be utilized to encode information in half-toned images. In the prior art, since there is a single set of dither matrices of use in rendering images, information cannot be encoded into the halftoning process of images. However, since the present invention provides a mechanism for designing multiple sets of color matrices that tile together jointly, information can now be encoded into a half-toned image by selecting a particular set of color matrices to halftone certain portions of the half-toned image. By selectively changing the sets of color matrices that are utilized to generate the half-toned images, a first image can be half-toned in such a manner so that a person viewing the half-toned image believes they are the same, where in fact the half-toned images are different since they are half-toned by using different set of color matrices.

Figure 9:
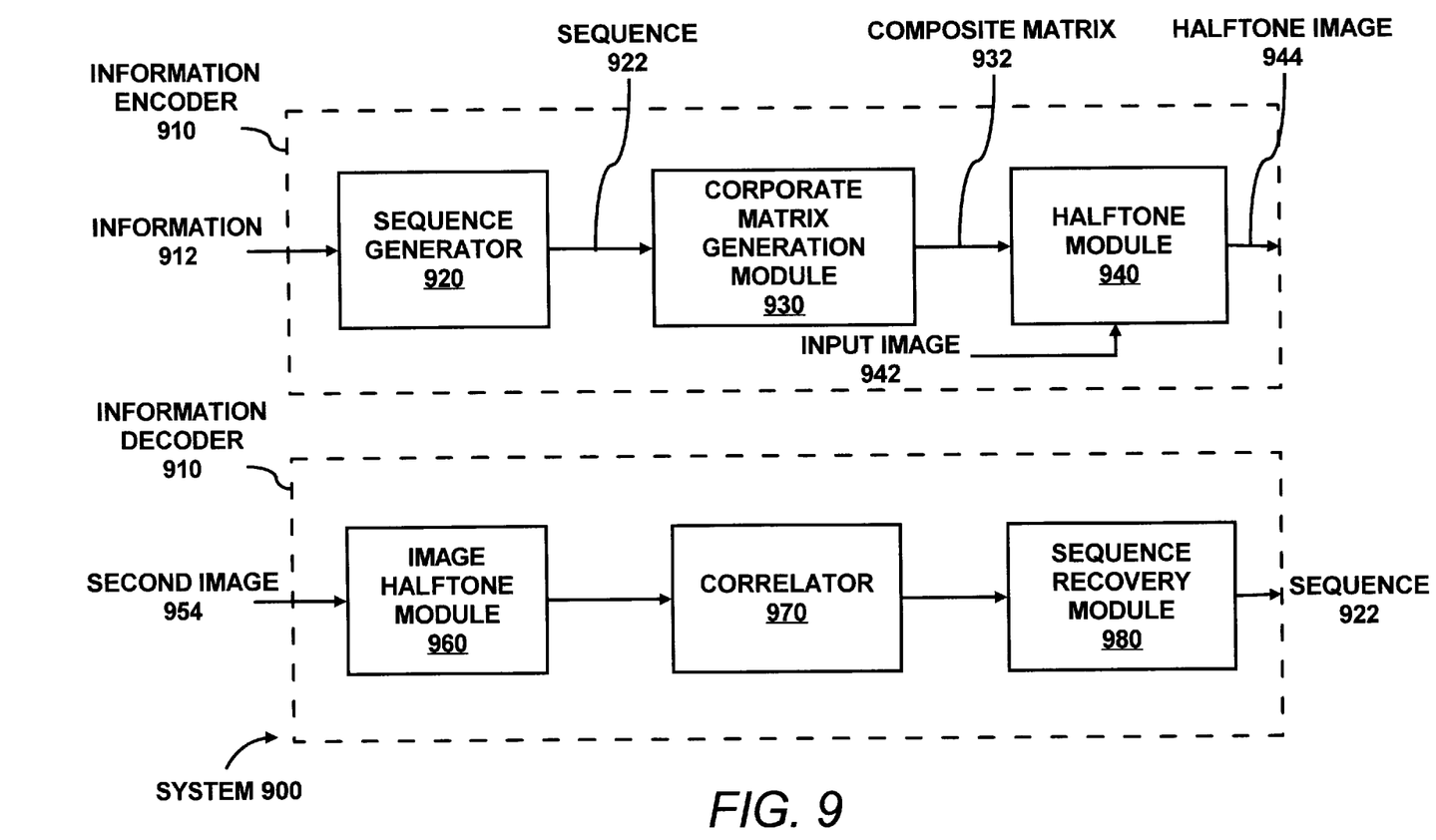
FIG. 9 is a block diagram of a system in which the sets of color matrices designed by the present invention can be used to encode and recover information.

As a non-limiting example, the multiple sets of color matrices of the present invention can be used in a security system for identifying the source of a given print. FIG. 9 is a block diagram of a system 900 in which the sets of color matrices designed by the present invention can be used to encode and recover information. The system 900 includes an information encoder 910 for encoding information 912 in an input image 942 to generate a half-tone image 944 with encoded information and an information decoder 950 for recovering the encoded information 912 from a scanned version 954 of a half-tone image.

The information encoder 910 includes a sequence generator 920 for receiving the information 912 to be encoded and based thereon for generating a sequence 920 representing the information 912. A composite matrix generation module 930 is coupled to the sequence generator 920 for receiving the sequence 920 and based thereon generates a composite matrix 932 that specifies a particular set of color matrices to be utilized in the half-toning process for a particular region (e.g. pre-determined region of pixels) in an image. For example, a run-time map can be created that contains the sequence 922. For example, where there are a total of three sets of color matrices, one possible sequence might be "021002", with the 0, 1 and 2 representing the color tile number. Thus, the "021002" sequence represents a code that might represent the serial number of a rendering process or rendering device (e.g., printer).

A half-tone module 940 is coupled to the composite matrix generation module 930 for receiving the composite matrix 932, receives an input image 942 (e.g., a continuous image) to be half-toned, and based thereon, generates a half-tone image 944. It is noted that 944 is half-toned by using the multiple sets of color matrices as specified by the composite matrix 932.

The information decoder 950 includes an inverse half-tone module 960 (e.g., a scanner) for receiving a scanned image 954 and performing inverse half-toning thereon to generate a continuous tone image. A correlator 970 is coupled to the inverse half-tone module 960 for receiving the continuous tone image, and based thereon correlates the actual halftone with one of the set of color matrices. A sequence recovery module 980 is coupled to 970 for receiving the correlation image, and based thereon recovers the sequence 922. The encoded information 912 can be derived from the sequence 922.

One aspect of the present invention is the design of multiple sets of color dither matrices that occupy less storage space than a single set of dither matrices.

Another aspect of the present invention is the design of multiple sets of color dither matrices that when utilized in a halftone process generates images with improved print quality. By utilizing color dither matrices from different sets in a random fashion, periodic artifacts can be eliminated from the halftone image.

Yet another aspect of the present invention is the design of multiple sets of color dither matrices that tile together seamlessly in order to enable the encoding of information in half-tone images.

While the description above refers to particular embodiments of the present invention, it will be understood that many modifications may be made without departing from the scope thereof. The accompanying claims are intended to cover such modifications as would fall within the true scope of the present invention.

What is claimed is:

1. A method of designing color dither matrices comprising:
    a) generating a design tile map;
    b) receiving at least two color tiles; wherein each color tile is identified by a color tile number (CTN); wherein each color tile includes a plurality of pixels that are divided into a plurality of concentration levels that are specified by a color tile concentration level (CTCL);
    c) setting the CTCL of each color tile to a first CTCL value;
    d) initializing all the color tiles;
    e) generating a mosaic color tile based on the design tile map, the mosaic color tile having a plurality of color tile locations; wherein the design tile map specifies a particular color tile for each color tile location; and
    f) jointly designing at least two sets of color tiles without using a training process;
    wherein the two sets of color tiles together seamlessly.

2. The method of claim 1 wherein each pixel is either a one or zero, the method further comprising the step of:
    g) designing a color tile for all concentration levels for each set of color tiles; and
    h) building a color dither matrix for each set of color tiles based on the color tiles for all concentration levels for that set of color tiles; wherein the sets of color dither matrices tile together seamlessly.

3. The method of claim 2 wherein each set of color dither matrices includes a dither matrix for a first color plane, a dither matrix for a second color plane, a dither matrix for a third color plane, and a dither matrix for a fourth color plane.

4. The method of claim 3 wherein the first color plane is a cyan color plane, the second color plane is a magenta color plane, the third color plane is a yellow color plane, and the fourth color plane is a black color plane.

5. The method of claim 1 wherein jointly designing at least two sets of color tiles without using a training process includes the steps of:
   (f1) setting the CTN to a first CTN value;
   (f2) evaluating each pixel for swapping with every other pixel in the current color tile in raster scan order; wherein the current color tile is identified by the CTN;
   (f2) determining if the CTN is equal to a predetermined last CTN value;
   (f3) if no, incrementing the CTN and proceeding to step (f1);
   (f4) otherwise, computing a color fluctuation function on the mosaic color tile and determining if a decrease in color fluctuation function is less than a predetermined threshold;
   (f5) if no, proceeding to step (f1);
   (f6) otherwise, storing the values of the pixels for the current concentration level for all the color tiles and determining if the CTCL is equal to a predetermined last CTCL value;
   (f7) if no, incrementing the CTCL and proceeding to step (d);
   (f8) otherwise generating at least two sets of color dither matrices based on the stored bit patterns for all CTCL and for all CTN.

6. The method of claim 5 wherein the step of evaluating each pixel for swapping with every other pixel in the current color tile includes
   performing one of a swapping operation and a toggling operation on the pixels of the current color tile.

7. The method of claim 1 wherein the CTCL can have a value in the range of 1 to 255.

8. The method of claim 1 wherein each set of color dither matrices includes a dither matrix for a first color plane, a dither matrix for a second color plane, and a dither matrix for a third color plane.

9. The method of claim 8 wherein the first color plane is a red color plane, the second color plane is a green color plane, the third color plane is a blue color plane.

10. The method of claim 8 wherein the first color plane is a cyan color plane, the second color plane is a magenta color plane, the third color plane is a yellow color plane.

11. A method of converting a continuous tone image into a color halftone image comprising:
   (a) receiving a first set of color dither matrices, wherein the first set of color dither matrices is a matrix having a pattern with values from 0 to 255 that is the sum of a plurality of tiles at all concentration levels;
   (b) receiving a second set of color dither matrices, wherein the second set of color dither matrices is a matrix having a pattern with values from 0 to 255 that is the sum of a plurality of tiles at all concentration levels;
   (c) generating a tile map for specifying the use of one of the first set of dither matrices and the second set of dither matrices for halftoning each location in the continuous-tone image;
   (d) receiving a pixel value from the continuous-tone image; and
   (e) rendering the pixel value with a corresponding halftone pixel by utilizing one of the first set of dither matrices and the second set of dither matrices based on the tile map.

12. A method of converting a continuous tone image into a color halftone image comprising:
   (a) receiving more than two sets of color dither matrices, wherein the sets of color dither matrices are matrices having patterns with values from 0 to 255 that is respectively the sum of a plurality of tiles at all concentration levels;
   (b) generating a tile map for specifying the use of one set of color dither matrices for halftoning each location in the continuous-tone image;
   (c) receiving a pixel value from the continuous-tone image; and
   (d) rendering the pixel value with a corresponding halftone pixel by utilizing the set of color dither matrices specified by the tile map.

13. A method of encoding and decoding information in color halftone images comprising:
   (a) receiving a continuous tone image having a plurality of regions;
   (b) receiving a first set of color dither matrices;
   (c) receiving a second set of color dither matrices that tile together seamless with the first set of color dither matrices;
   (d) receiving information to be encoded;
   (e) generating a halftone map having a plurality of elements, each element corresponding to a region of the continuous tone image, the element having a value for specifying one of the first set of color dither matrices and the second set of color dither matrices for halftoning a region; wherein the value of each element is set based on at least a portion of the information; and
   (f) halftoning the continuous tone image to generate a color halftone image by using the halftone map; wherein the information is encoded into the halftone image.

14. The method of claim 13 further comprising:
   receiving the color halftone image;
   performing an inverse halftone operation on the color halftone image; and
   performing a correlation procedure for recovering the information from the color halftone image.

15. The method of claim 13 wherein the information to be encoded is an identifier for uniquely identifying a process that rendered the color halftone image.

16. The method of claim 13 wherein the information to be encoded is an identifier for uniquely identifying a rendering machine that rendered the color half-tone image.

17. A method of encoding and decoding information in color halftone images comprising:
   (a) receiving a continuous tone image having a plurality of regions;
   (b) receiving more than two sets of color dither matrices; wherein the sets of color dither matrices tile together seamlessly;
   (c) receiving information to be encoded;
   (d) generating a halftone map having a plurality of elements, each element corresponding to a region of the continuous tone image, the element having a value for specifying one of the sets of color dither matrices for halftoning a region; wherein the value of each element is set based on at least a portion of the information; and (f) halftoning the continuous tone image to generate a color halftone image by using the halftone map; wherein the information is encoded into the halftone image.

18. A computer readable storage medium on which is embedded one or more computer programs, said one or more computer programs implementing a method of designing color dither matrices, said one or more computer programs comprising a set of instructions for:

a) generating a design tile map;

b) receiving at least two color tiles; wherein each color tile is identified by a color tile number (CTN); wherein each color tile includes a plurality of pixels that are divided into a plurality of concentration levels that are specified by a color tile concentration level (CTCL);

c) setting the CTCL of each color tile to a first CTCL value;

d) initializing all the color tiles;

e) generating a mosaic color tile based on the design tile map, the mosaic color tile having a plurality of color tile locations; wherein the design tile map specifies a particular color tile for each color tile location; and f) jointly designing at least two sets of color tiles without using a training process; wherein the two sets of color tiles together seamlessly.

19. The computer readable storage medium according to claim 18, said one or more computer programs further comprising a set of instructions for:

g) designing a color tile for all concentration levels for each set of color tiles; and h) building a color dither matrix for each set of color tiles based on the color tiles for all concentration levels for that set of color tiles; wherein the sets of color dither matrices tile together seamlessly.

20. The computer readable storage medium according to claim 18, said one or more computer programs further comprising a set of instructions for:

(f1) setting the CTN to a first CTN value;

(f2) evaluating each pixel for swapping with every other pixel in the current color tile in raster scan order; wherein the current color tile is identified by the CTN;

(f2) determining if the CTN is equal to a predetermined last CTN value;

(f3) if no, incrementing the CTN and proceeding to step (f1);

(f4) otherwise, computing a color fluctuation function on the mosaic color tile and determining if a decrease in color fluctuation function is less than a predetermined threshold.

(f5) if no, proceeding to step (f1);

(f6) otherwise, storing the values of the pixels for the current concentration level for all the color tiles and determining if the CTCL is equal to a predetermined last CTCL value;

(f7) if no, incrementing the CTCL and proceeding to step (d);

(f8) otherwise generating at least two sets of color dither matrices based on the stored bit patterns for all CTCL and for all CTN.

* * * * *